United States Patent [19]

Berkley et al.

[11] Patent Number: 5,003,722
[45] Date of Patent: Apr. 2, 1991

[54] FLYING GAME BIRD DECOYS

[75] Inventors: Robert D. Berkley, Haughton; Terry P. Shaughnessy, Hackberry, both of La.

[73] Assignee: Packaging Industries Group, Inc., Hyannis, Mass.

[21] Appl. No.: 416,479

[22] Filed: Oct. 3, 1989

[51] Int. Cl.⁵ ............................................. A01M 31/06
[52] U.S. Cl. ........................................................ 43/3
[58] Field of Search ........................................ 43/2, 3

[56] References Cited

U.S. PATENT DOCUMENTS

| D. 111,205 | 9/1938 | Orndorff | D10/59 |
|---|---|---|---|
| 1,083,882 | 1/1914 | Hindmarsh | 43/3 |
| 2,441,753 | 5/1948 | Carpenter | 43/3 |
| 2,783,572 | 3/1957 | Rohan | 43/3 |
| 3,029,541 | 4/1962 | Palmer | 43/3 |
| 3,707,798 | 1/1973 | Tryon | 43/3 |
| 4,651,457 | 3/1987 | Nelson et al. | 43/3 |

Primary Examiner—Richard K. Seidel
Assistant Examiner—James Miner
Attorney, Agent, or Firm—Berman, Aisenberg & Platt

[57] ABSTRACT

A game bird decoy has a body portion and a wing portion cut from flexible sheet plastic foamed material and assembled to represent a flying game bird such as a duck or goose. The decoy is mounted on a pole to simulate the silhouette of a bird approaching landing on water or land.

17 Claims, 1 Drawing Sheet

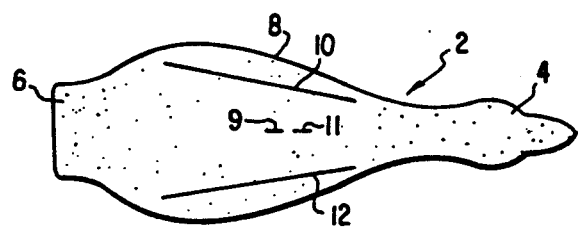
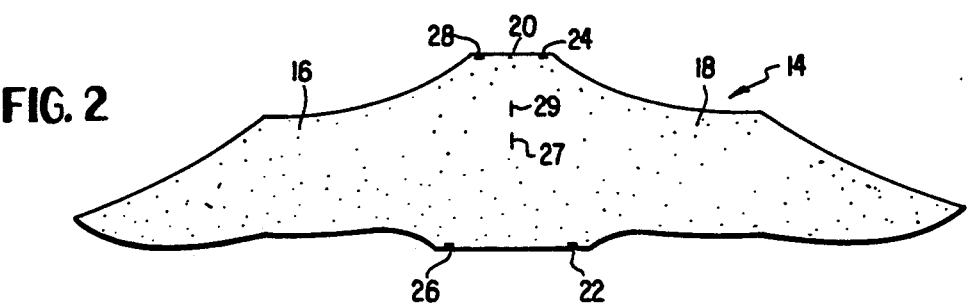
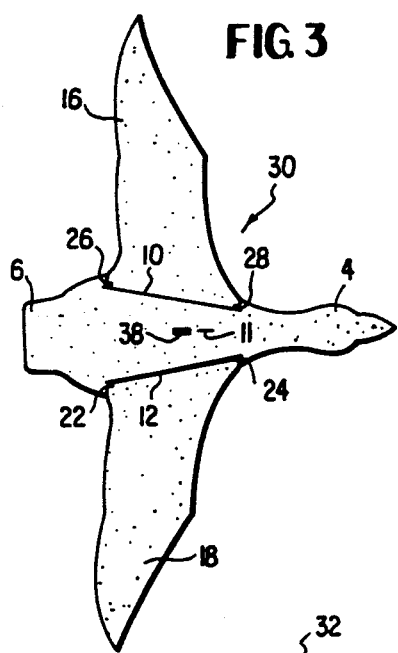
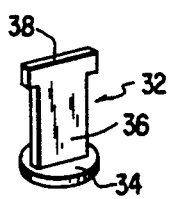
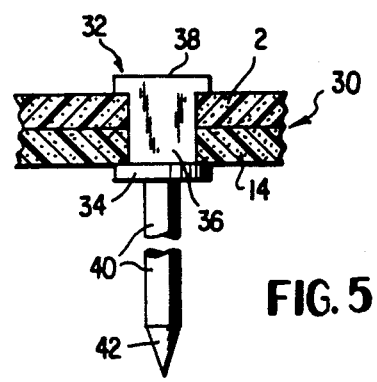
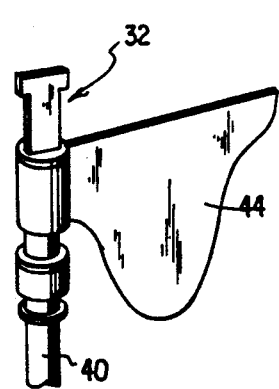
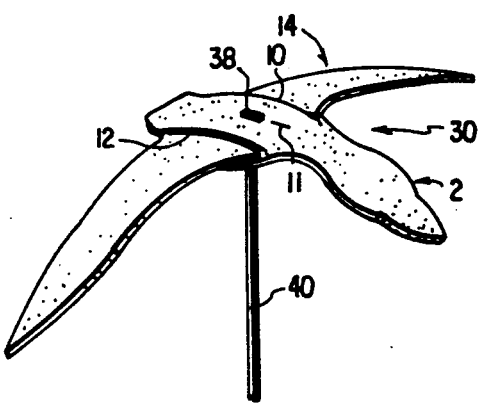

FLYING GAME BIRD DECOYS

FIELD OF THE INVENTION

The invention relates to hunting decoys representing flying game birds.

BACKGROUND OF THE INVENTION

Duck and goose decoys are well known for attracting flying birds to shooting range for a hunter. Known decoys represent birds, such as ducks and geese, sitting either on land or in the water. A hunter places the decoys as needed before taking up his hunting position in a blind, or otherwise concealed.

SUMMARY OF THE INVENTION

The game bird decoys of the invention are made from flexible sheet plastic material, preferably foam sheet material, and represent a bird in flight. A portion representing the body of a game bird is cut from flexible sheet plastic material and another portion representing the wings of the bird is cut from the same or different material. The wing portion is slotted through two slits in the body portion to form a flexible silhouette of a game bird when viewed from above. Notches on the wing portion engage ends of the slits to hold the wing portions firmly in position. Both wings are preferably represented by a single piece slotted through the body portion. Separate wing portions may also be used. The bird decoy is assembled and mounted on a pole or other device to raise the decoy above ground level, giving the appearance, from above, of a bird in flight, about to land.

BRIEF DESCRIPTION OF THE DRAWINGS

FIG. 1 is a top plan view of a body piece for a bird decoy.

FIG. 2 is a top plan view of a wing piece for a bird decoy of FIG. 1.

FIG. 3 is a top plan view of an assembled bird decoy.

FIG. 4 is a perspective view of a clip for assembling a decoy

FIG. 5 is a cross-sectional view of a supporting structure for a decoy of FIG. 3.

FIG. 6 is a cross-sectional view of another supporting structure for a decoy.

FIG. 7 is a perspective view of a decoy mounted for use.

DETAILED DESCRIPTION OF THE INVENTION

The invention uniquely provides a decoy having the appearance of a flying bird about to land on ground or water. From above, the bird silhouette is seen, with wings outstretched. The decoy is preferably made from foamed plastic sheet material which has a certain amount of flexibility allowing some movement in the wind simulating a flying bird. Each decoy is mounted on a pole and several decoys may be mounted at different heights to give the impression of a flock of birds coming in to land.

With reference to the Figures, in which like numerals represent like parts, FIG. 1 shows a body portion 2 of a bird decoy of the invention. The body portion includes head 4, tail 6 and central body portion 8. Two slits 10 and 12 are cut longitudinally through central portion 8 for receiving wing section 14, shown in FIG. 2. Slits 9 and 11 are cut in central portion 8 as alternative positions for receiving a mounting support, such a clip 32 shown in FIG. 4.

Wing portion 14, shown in FIG. 2, is also cut from foamed plastic sheet material and includes wings 16 and 18 joined by central portion 20. When wing portion 14 is inserted through slits 10 and 12 in body portion 2, central portion 20 passes under body portion 2 so that wings 16 and 18 overlap the side portions of central body portion 8 of the decoy. Wing portion 14 has notches 22 and 24 for engaging opposite ends of slit 10, and notches 26 and 28 for engaging opposite ends of slit 12. Thus, wing portion 14 is securely held in position interlocked with body portion 2. Wing portion 14 also includes slits 27 and 29 which are alternative positions for receiving a mounting support, such as clip 32, shown in FIG. 4. The assembled bird decoy is shown in FIG. 3.

Clip 32, shown in FIGS. 4 and 5, is a suitable clip for use in assembling a decoy of the invention. Base 34 rests below the decoy. Clip 32 may be fastened through slit 27 of wing portion 14 and then through slit 9 of body portion 2, in sequence. Alternatively, clip 32 may be fastened through slit 29 of wing portion 14 and then through slit 11 of body portion 2, in sequence. Top portion 38 of clip 32 is pushed through the slits and rests on top of the bird decoy. The particular slits used are chosen according to the orientation and simulated flight characteristics required. Portion 36 of the clip is approximately the same height as the combined thickness of the body portion and the wing portion of the decoy.

The decoy is mounted on a suitable stand, such as a pole 40, shown in FIG. 5, which may have a pointed lower end 42 for facilitating entry into the ground. The stand shown in FIG. 5 is used to elevate decoy 30 above ground level. Clip 32 is attached to the stand by any suitable method.

In another embodiment, the decoy is mounted on a structure, such as that shown in FIG. 6, which turns in the wind so that a decoy may be mounted to face into the wind. Freely turning vane 44 is inserted into the top of pole 40, and a decoy is mounted on clip 32 attached above vane 44, as shown in FIG. 6. The decoy is attached as shown in FIG. 5.

The articulated vane rotates freely on pole 40 by means of joints made of teflon or other low friction material. FIG. 7 shows a flying game bird decoy mounted on a pole of FIGS. 5 or 6.

The most preferred material for the decoy of the invention is foamed plastic sheet material between about 0.18 to 0.5 inch thick. Foam sheet which is too thin is too flexible to retain the bird shape and moves too much in the wind so that the flight position of a game bird coming in to land is not realistically simulated. Foam sheet material which is too thick prevents the decoy from being sufficiently flexible and also does not present a realistic appearance. A preferred foam is closed cell crosslinked polyolefin foam, such as polyethylene foam, of about 2 to 4 pounds density. Other foams may be used in place of the preferred foam provided that proper stiffness to promote bird-like characteristics of movement in a breeze are maintained. Decoys made of the preferred materials are long-lasting and may be reused many times. The pole may be aluminum tubing and the clip is preferably of molded plastic. Other stands and decoy mounting clips may be used.

The decoys may represent any type of game bird to be attracted to within shooting range of a hunter. For non-limiting examples, a decoy may represent a Canada goose, snow goose, or mallard duck. The body and wing portions are cut to the size and shape of the bird represented.

Other variations will be apparent to one skilled in the art. For example, it is within the scope of the invention for wing portion 14 to be divided into two separate wings 16 and 18 or, alternatively, body portion 2 and wing portion 14 may be made of one piece. A one piece decoy might be suitable where strong winds are not expected.

Decoys of the invention are painted as appropriate for simulation of the birds represented. The decoys mounted o poles appear to attract flying game birds. It has been observed that, in use, flying game birds fly parallel to and land in front of the decoys.

While the invention has been described above with respect to certain embodiments, it will be appreciated that variations and modifications may be made without departing from the spirit and scope of the invention.

What is claimed is:

1. A game bird decoy comprising:
   means for representing a body portion of a game bird comprising flexible foamed sheet plastic material;
   means for representing a wing portion of a game bird comprising flexible foamed sheet plastic material; and
   means for securing said wing portion means to said body portion means;
   wherein said wing portion means is inserted through slits in said body portion means and said securing means comprises a clip for securing the wing portion means and the body portion means together by passing said clip through slits in said body portion means and said wing portion means respectively, whereby said game bird decoy simulates a game bird in flight when viewed from above.

2. A decoy according to claim 1 wherein said body means comprises a plurality of slits for inserting said wing means through said body means.

3. A decoy according to claims 2 wherein said wing means comprises a plurality of notches for engaging said slits and for holding said wing means in position with respect to said body means.

4. A decoy according to claim 1 further comprising means for supporting said decoy above ground level in simulated flying position.

5. A decoy according to claim 4 wherein said support means comprises a pole.

6. A decoy according to claim 1 shaped and colored to simulate a flying duck.

7. A decoy according to claim 1 shaped and colored to simulate a flying goose.

8. A decoy according to claim 1 wherein the securing means passes through slits in the body means and wing means.

9. A decoy according to claim 8 wherein the securing means is a clip comprising a top portion positioned on top of the decoy and a bottom portion positioned beneath the decoy when the clip is secured through said slits.

10. A decoy according to claim 1 wherein the decoy is mounted on means for elevating the decoy above ground level.

11. A decoy according to claim 10 wherein the securing means is attached to the elevating means.

12. A decoy according to claim 11 further comprising means for rotating the decoy in the wind engaged with said elevating means.

13. A decoy according to claim 1 wherein said sheet plastic material is foamed sheet plastic material.

14. A decoy according to claim 13 wherein said foamed sheet plastic material is closed cell polyolefin foam.

15. A decoy according to claim 14 wherein said polyolefin foam is polyethylene foam.

16. A decoy according to claim 15 wherein said foam is closed cell crosslinked polyethylene foam.

17. A decoy according to claim 13 wherein said foamed sheet plastic material has a density of about 2–4 lb./cu. ft.

* * * * *